Sept. 4, 1923.
1,467,218
J. V. WILMOTH
AIR INLET VALVE.
Filed Sept. 16, 1920
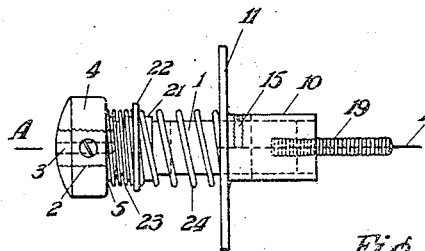

Patented Sept. 4, 1923.

1,467,218

UNITED STATES PATENT OFFICE.

JOHN VICTOR WILMOTH, OF ELSTERNWICK, VICTORIA, AUSTRALIA.

AIR-INLET VALVE.

Application filed September 16, 1920. Serial No. 410,677.

*To all whom it may concern:*

Be it known that I, JOHN VICTOR WILMOTH, a subject of the King of Great Britain, residing at No. 235 Kooyong Road, Elsternwick, in the State of Victoria and Commonwealth of Australia, have invented an Air-Inlet Valve, of which the following is a specification.

This invention of an improved extra air device for internal combustion-engined motor vehicles has been devised for the purpose of overcoming the serious objection to those types of extra air devices in use at present, owing to the amount of trouble and attention needed (often at inconvenient times) to so manipulate them as to avoid stopping the engine. Owing to these drawbacks, extra air devices on such vehicles are made use of to a very limited extent and then only on long country runs. My improved device is so constructed that it may be operated at all times and under all conditions by that foot of the driver, which, when not used for operating the clutch pedal, is placed upon the operating part of my device, and which part constitutes a rest for said foot. The weight of the driver's foot upon said operating part is sufficient to open and keep open the valve to the required extent to admit of extra air being supplied to the induction pipe in order to save the consumption of petrol. On the removal of the driver's foot from said operating part to release the clutch, in order to change gear or stop at a crossing, the air valve automatically closes, thus leaving the combustible mixture passing from the carbureter to the cylinders of the engine in a normal condition. Another feature of my improved extra air device consists in so constructing it that, when the device is required to be used as an air brake, an increased pressure of the driver's foot upon the operating part before referred to, will cause the air valve to open to its fullest extent, thus admitting a considerable quantity of air to the induction pipe, and, at the same time, permitting of said valve returning to its normal position when such pressure is removed. Whether my device is used as a petrol saver or as an air brake, it is impossible to leave the air valve open when stopping a motor vehicle fitted therewith, or to declutch when using it as an air brake. My invention also consists of certain improvements in the air valve and its casing.

Referring to the annexed drawings:—

Figure 1 is a side elevation of my improved extra air device, the control wire being shown broken away;

Figure 2 is a front elevation of Figure 1;

Figure 3 is a longitudinal section on the line A—A, Figure 1;

Figure 4 is a cross section on the line B—B, of the valve and casing, shown in Figure 3;

Figure 5 is a side elevation of a modified form of apparatus for operating the air valve;

Figure 6 is a plan of Figure 5, the footplate, hereinafter referred to, being shown dotted;

Figure 7 is a plan of the valve and valve casing shown in Figure 1.

Referring now to Figures 1, 2, 3, and 4, of the drawings, 1 is a plunger of circular section provided at its outer end with a screwed portion 2 of smaller diameter than the body of the plunger. Extending the whole length of said screwed portion 2, and diametrically opposite to one another, are two semi-circular grooves 3. 4 is an internally screwed circular nut which engages with the screwed portion 2 of plunger 1. The outer face of this nut is rounded, the inner face being provided with a circular boss 5. A hole is drilled in the side of said nut 4, at right angles to the bore thereof, in such manner as to form a seating for a steel ball 7 which movably engages with one or other of the groves 3 and is forced inwards by the spring 8; the whole being secured in position by grub screw 9. As the steel ball 7 engages with one of the slots 3 on each half revolution of the nut 4, the latter is capable of adjustment along the length of the screw 2, and, when adjusted, will not shake loose owing to vibration or other cause. The inner end of the plunger 1 is encased in a cylindrical guide 10, the outer end of which is formed with a flange 11, said flange being provided with countersunk holes 12 for the reception of screws for the purpose of securing it to the footboard of the car to which my device is applied. Passing through the guide 10 and a rectangular slot 13 in the plunger 1 is a pin 14. The upper half of said pin is internally screw-threaded to receive a screw 15 for the purpose of gripping the inner end of the control wire 16 which passes through a horizontal hole 17 drilled in the pin 14. Said pin also acts as a guide for the plunger 1 and forms a stop by limiting its movement either outwardly or inwardly. The inner end of the plunger 1 has a recess 18 at its centre to take the end of the control wire casing 19, and extending longitudinally from the centre of said recess to the other end of the plunger, is a hole 20 to permit of the control wire 16 being passed therethrough when being placed in position. Passing around the outside of the plunger 1 and fitting easily thereon is a collar 21 of the same external diameter as the circular boss 5 of the nut 4, said collar having an outwardly extending circular rib 22 which is situated midway of the length of said collar. Between the rib 22 and the nut 4 and encircling the said plunger 1, is a weak coiled spring 23, whose internal diameter is the same as the external diameter of the boss 5 and collar 21. Between the rib 22 and the flange 11 on the cylindrical guide 10, and encircling the plunger 1 is another and stronger spring 24 of the same internal diameter as spring 23. The outer face of the flange is provided with a recess 25, the external diameter of which is such that it accommodates the end of the spring 24. 26 is a cylindrical valve having a recess 27 formed around its circumference. One end 28 of said valve 26 is flat, the other end having a circular recess 29 and behind said recess is a conical recess 30, the base of which is less in diameter than that of the circular recess 29. The apex of this conical recess is at a point about midway of the length of the valve 26, and from said apex and in communication with the conical recess 30, is a hole 31, which extends longitudinally into the body of the valve 26. The outer end of the control wire 16 is inserted in said hole 31 and is secured therein by means of the screw 32 which passes through the side of the valve 26. The said valve 26 is enclosed in a cylindrical casing 33, the outer end of which is reduced to a smaller internal diameter 34 to form a seating 35 for the flat end 28 of the valve 26. The portion 34 of the casing 33 is formed with an external screw thread 36 to enable said casing to be attached to the induction pipe of the engine. The other end of the casing 33 is fitted with a cylindrical plug 37. 38 is a passage through said plug to admit of the control wire 16 and its casing 19 being passed therethrough. The cylindrical plug 37 is held in position by the screw 39 which passes through the casing 33 and also through an internally screwed hole in the plug 37. This screw extends inwardly and secures the control wire casing 19 in position in the passage 38. The inner end of the plug 37 is provided with a circular recess 40 which forms a seating for the spring 41, the other end of which fits into the recess 29 in the valve 26. This spring is for the purpose of normally keeping the said valve on its seat 35. The cylindrical valve casing 33 is provided with a rectangular opening 42 on each side thereof between the plug 37 and the valve seat 35, and from these openings, slots 43 in the cylindrical casing 33 extend outwardly towards the valve seat, for admission of air to the induction pipe. The number and length of the slots 43 may be varied to suit the conditions called for by any particular type of engine.

When my improved extra air device illustrated in Figures 1, 2, 3, and 4 is used as a petrol saver, the weight of that foot of the driver of the vehicle which, as before explained, normally rests on the nut 4, causes the plunger 1 to be moved forward against the resistance of the weak coiled spring 23. The forward movement of plunger 1 is conveyed to the control wire flexible casing 19, one end of which lies in the recess 18 in the inner end of the plunger 1, the other end thereof being secured in the recess 38 of the circular plug 37 of the valve casing 33. The forward movement of plunger 1 slides casing 19 along wire 16, but said wire 16 being held immovable in pin 14 at one end, and casing 19 being held immovable in plug 37 at the other end, said casing bends slightly, valve 26 is lifted from its seat 35, thus permitting air to flow to the induction pipe of the engine through the slots 43 in the valve casing 33. On the driver's foot being removed from said nut 4 the valve automatically closes. When it is desired to use my extra air device as an air brake further pressure is applied by the foot of the driver to the nut 4, thus causing the plunger 1 to move forward against the resistance of the stronger spring, and causing the valve 26 to move backward sufficiently far to admit of air passing to the passage 34 not only through the slots 43 but also through the rectangular openings 42, thus allowing a large volume of air to pass into the induction pipe thereby causing the mixture passed to the engine cylinders to have an excess of air which prevents the usual explosion from taking place, and so reduces the speed of the vehicle to which my invention is applied, thus avoiding the use of the foot brake. The nut 4 can be adjusted on the screwed portion 2 of the plunger 1, so as to regulate the amount of lift given to the valve 26 on compression of the weak spring only, according as to whether more or less air is required to be passed to the induction pipe.

Referring now to Figures 5 and 6 which, as before explained, illustrate a modified form of apparatus for operating the air valve by the foot of the driver of the vehicle to which my extra air device is applied, and which modified form is adapted for use with motor vehicles in which there is not room under the foot-board for the plunger and its appurtenant parts illustrated in Figures 1, 2, and 3 of the drawings. 44 is a lever which is centred by means of a pin 45 between two supports 46 which are cast integral with a base 47, said base being provided with countersunk holes 12 for the reception of screws for the purpose of securing it to the foot-board of the car. At one end of the lever 44 is a boss 48 which is internally and approximately vertically screw-threaded, and engaging therewith is an externally screwed spindle 49, which is provided with two semi-circular grooves (not shown) which are diametrically opposite one another, and extend along its length. To the upper portion of the screwed spindle 49 is secured a foot-plate 50. 7 is a steel ball which movably engages with one or other of the semi-circular grooves before referred to, and is forced inwards by the spring 8, the ball and spring being located in a recess 50ᴬ in the boss 48. As the steel ball 7 engages with one of said semi-circular grooves on each half revolution of the spindle 49, the said spindle is capable of being raised and lowered so that the distance said spindle extends beneath the boss 48 can be adjusted, and, at the same time, prevent its shaking loose. The other end of the lever 44 is provided with a boss 51, which is at right angles to the boss 48 before referred to. 52 is a pin which passes through said boss. A small hole is bored through the underside of the boss 51 and through the pin 52, and through these holes the end of the control wire 16 passes. The pin 52 and the control wire 16 are held in position by the screw 53, which passes through said pin 52, said pin being provided with an internally screw-threaded hole at right angles to its length to receive screw 53. At a point below the boss 51 the base 47 is turned upwardly, and, cast on its upper side, is a conical boss 54 which is bored to allow the control wire 16 and its casing 19 to pass therethrough, the casing being held in position by means of the screw 55. Extending from the inner side of the conical boss 54 to the base 47 is a lug 56 to which is connected the lower end of the coiled spring 57, the upper end of said spring being connected to the underside of the lever 44 at a point about midway between the boss 51 and the pin 45. Cast integral with the base 47 and at the end nearest the lug 56 is a raised portion 58 which slopes downwards towards said lug. This raised portion forms a seating for, and has riveted to it, a flat spring 59 which passes between the two supports 46 and extends outwardly to a point below and slightly beyond the lower end of the screwed spindle 49. The other end of the control wire 16 and its casing 19 are connected with a valve and valve casing, similar in all respects to that described and illustrated in Figures 1, 3, and 4.

The mode of operation of this modified form of apparatus for operating the air valve is similar to that described in reference to Figures 1, 2, 3, and 4, save and except that when the foot of the driver rests on the plate 50, that end of the lever 44 to which said plate 50 is attached is depressed against the resistance of the weak coiled spring 57, until the lower end of the screwed spindle contacts with but does not depress flat spring 59, thus lifting the other end of the lever and drawing the control wire 16 through its casing 19, thus causing the valve 26 to be lifted from its seat 35 and permitting of air passing through the slots 43 to the passage 34 and from thence to the induction pipe of the engine. When further pressure is applied to the plate 50, the lower end of the screwed spindle which is in contact with that end of the flat spring 59 immediately beneath it, depresses it, at the same time further extending spring 57 and drawing the control wire further through its casing, thereby opening the valve 26 to its fullest extent to admit of a large volume of air passing to the passage 34, as and for the purpose previously explained.

I claim:

1. In an extra air device of the class described, means for operating the air valve, comprising in combination with the control wire of said valve, a base two supports cast integral therewith, a lever centered between the said supports, the other end of said control wire being attached to the one arm of said lever, a foot-plate at the other end of said lever, one end of said base being turned upwardly and being formed with a bored-out boss on its upper side, through which boss the control wire passes, a casing for the said wire being held in position in said boss, a coiled spring attached at one end to a lug on the inner side of said boss, and at its other end to the underside of the lever between that end to which the control wire is attached and its centre, and a flat spring riveted to a seating on that end of said base at a point adjacent to said lug.

2. In an extra air device as specified in claim 1, an adjustable screw spindle contained in a boss of the said lever and adapted to cooperate with the said flat spring.

3. In an extra air device as specified in claim 1, a valve, one end being flat, and the other having a circular recess, a conical recess behind said circular recess, and a hole extending from the apex of said conical recess longitudinally into the body of the said valve and being in communication with the conical recess.

4. The combination with a valve as specified in claim 3, of a valve casing having a rectangular opening on each side thereof, and slots in said casing extending outwardly from said openings towards the valve seat, as and for the purpose described.

JOHN VICTOR WILMOTH.